United States Patent [19]

Tweeton

[11] 4,253,063
[45] Feb. 24, 1981

[54] IMPEDANCE MEASURING METHOD OF AND APPARATUS FOR DETECTING ESCAPING LEACH SOLUTION

[75] Inventor: Daryl R. Tweeton, Apple Valley, Minn.

[73] Assignee: The United States of America as represented by the Secretary of the Interior, Washington, D.C.

[21] Appl. No.: 950,762

[22] Filed: Oct. 12, 1978

[51] Int. Cl.³ .......................... G01V 3/20; G01V 3/02
[52] U.S. Cl. ................................... 324/323; 324/324; 324/372
[58] Field of Search ................. 324/1, 9, 10, 324, 325, 324/366, 368, 372; 166/65 R, 66; 73/155

[56] References Cited

U.S. PATENT DOCUMENTS

| | | | |
|---|---|---|---|
| 2,183,565 | 12/1939 | Hawley | 324/1 |
| 2,400,593 | 5/1946 | Neufeld | 324/1 |
| 3,319,158 | 5/1967 | McDoulett et al. | 324/9 |
| 3,496,768 | 2/1970 | Boucher | 324/1 X |
| 3,929,011 | 12/1975 | Jones | 73/155 |
| 4,009,609 | 3/1977 | Sayer et al. | 73/155 |
| 4,071,278 | 1/1978 | Carpenter et al. | 166/65 R X |

*Primary Examiner*—Gerard R. Strecker
*Attorney, Agent, or Firm*—Gersten Sadowsky; Donald A. Gardiner

[57] ABSTRACT

In an in situ uranium leaching process, a method of detecting presence or absence of leach solution escaping from a desired leaching zone involves monitoring the electrical impedance of a zone just outside the desired zone to detect high ionic concentration indicative of leach solution. Electrical impedance is measured by locating monitor wells just outside the leaching zone and positioning pairs of current and voltage probes within the monitor wells and closest injection wells. Low frequency, constant current is generated by each pair of current probes between corresponding injection and monitor wells to develop a zone impedance-dependent voltage drop that is measured by each set of voltage probes and correlated to presence or absence of escaping leach solution. In an alternative embodiment, electrical impedances are measured between a single, central recovery well and a series of distributed, monitor wells to reduce the total number of probes required.

12 Claims, 6 Drawing Figures

IMPEDANCE MEASURING METHOD OF AND APPARATUS FOR DETECTING ESCAPING LEACH SOLUTION

TECHNICAL FIELD

The present invention relates generally to a method of monitoring the presence or absence of leach solution escaping from a desired leaching zone during in situ uranium leaching. The invention relates more particularly to a highly sensitive, improved method of and apparatus for monitoring escaping leach solution by measuring the electrical impedance of a predetermined region outside the desired leaching zone using sets of current and voltage probes and correlating the measured impedance to presence or absence of the solution.

BACKGROUND ART

As an alternative to conventional shaft and strip mining techniques to recover ores containing valuable metals such as uranium and other elements, a technique known as leaching has recently evolved for tapping underground ore bodies, in situ, by treating the underground ore with a leaching solution (lixiviant) which establishes oxidation-reduction reactions for separating and recovering a particular element or mineral from unwanted material in the ore body. The process involves mainly drilling an injection well into an underground ore deposit, and then introducing the leach solution to contact the ore. The leach solution dissolves the mineral within the ore deposit, and thereafter, the pregnant solution is recovered at a recovery well and processed by conventional extraction means to recover desired minerals therefrom.

In order to avoid contaminating an underground region outside of a desired leaching zone, it has been necessary to periodically monitor water samples withdrawn from monitor wells surrounding the leaching site. The water samples are analyzed for ions contained in the water samples. An increase in ion concentration in the samples is considered to be an indication of escaping leach solution in proximity to the monitor wells which are outside the desired leaching zone.

The above method is tedious and requires manual attention by personnel. Even more important, however, it is impossible to determine the presence of escaping leach solution until the solution actually reaches the monitor wells. Detection may therefore be delayed for a substantial period of time after escape begins. Even then, false indications of escaping leach solution sometimes occur because of locally high concentrations of ions in migrating ground water. A need exists, therefore, for a method of detecting escaping leach solution to avoid contamination of regions such as farm land outside the desired leaching zone that is faster and more reliable than previously known methods.

Accordingly, one object of the present invention is to provide a new and improved method of detecting leach solution escaping from a leaching zone.

Another object is to provide a method of and apparatus for detecting escaping leach solution that does not require sampling of solutions from individual monitor wells surrounding the leaching site.

Another object is to provide a new and improved method of and apparatus for detecting escaping leach solution that is faster and more reliable than prior methods.

Another object is to provide a new and improved method of detecting escaping leach solution that is adaptable to automation to reduce personnel requirements.

DISCLOSURE OF INVENTION

The above objects are satisfied by establishing monitor wells surrounding the standard injection wells and recovery wells formed within a desired leaching site. Escape of leach solution beyond the site is detected using current and voltage probes to monitor the electrical impedance of the subterranean regions between the injection wells and nearest monitor wells. A decrease in impedance between pairs of injection and monitor wells is caused by leach solution replacing the natural ground water between the wells and is therefore indicative of escaping leach solution. The impedance between the well pairs are continuously monitored or are monitored periodically over the life of the leaching operation. Occurrence and magnitude of escaping leach solution are periodically reviewed by personnel or are analyzed automatically by computer to determine the condition of the subterranean regions outside the leaching site.

In practice, in order to measure the electrical impedance of the ore formation distributed throughout the leaching site, a series of injection wells and recovery wells are established within the site in a pattern determined by particular mining requirements. Monitor wells are then drilled surrounding the injection and recovery wells outside the site. Each well is jacketed in an electrically insulated, corrosion resistant, casing. A portion of each casing at a preselected depth corresponding to the depth of the ore deposit is formed with a screen to pass leaching solution and dissolved materials. A first current probe is located within the monitor well just above the casing screen and a second current probe is positioned at a corresponding depth in the closest injection well. First and second voltage measuring probes are positioned, respectively, in the two wells adjacent the screens. A constant current source having a magnitude of up to 10 amperes and a frequency in the range of 1–20 Hz is connected to the current probes to establish a constant current flow through the voltage measuring probes, casing screens and ore deposit between the two wells. The voltage measured by the voltage probes is a function of electrical impedance of the ore deposit between the wells which in turn is a function of amount of leach solution present. Thus, any drop in voltage from an expected or nominal voltage is indicative of the presence of escaping leach solution between the injection well and monitor well.

As an alternative configuration, the voltage and current probes may be placed between a single, center recovery well and a series of outer, monitor wells surrounding the injection wells. Electrical impedances are measured between the center recovery well and the monitor wells. Since only a common current probe and a common voltage probe are located in the center recovery well for cooperation with the monitor well current and voltage probes, the total number of probes in the system is reduced by (M−1), where M is the number of monitor wells provided. I am aware that earth resistance monitoring has been used in the past for various purposes, such as porosity logging (e.g., see U.S. Pat. No. 3,975,674). I am also aware that it is known that leach solution has a characteristic impedance or conductance as described, for example, in U.S. Pat. No. 4,071,278. The present invention is based on the realization that escaping leach solution can be detected by monitoring the impedance of an ore formation being mined in situ by leaching, using the probe arrangement and operating parameters, described in detail below. Much higher sensitivity to presence of leach solution is realized by monitoring impedance or conductance from within the monitor and injection or recovery wells in accordance with the invention than by monitoring those parameters at the surface of earth, for example, or by known other methods.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
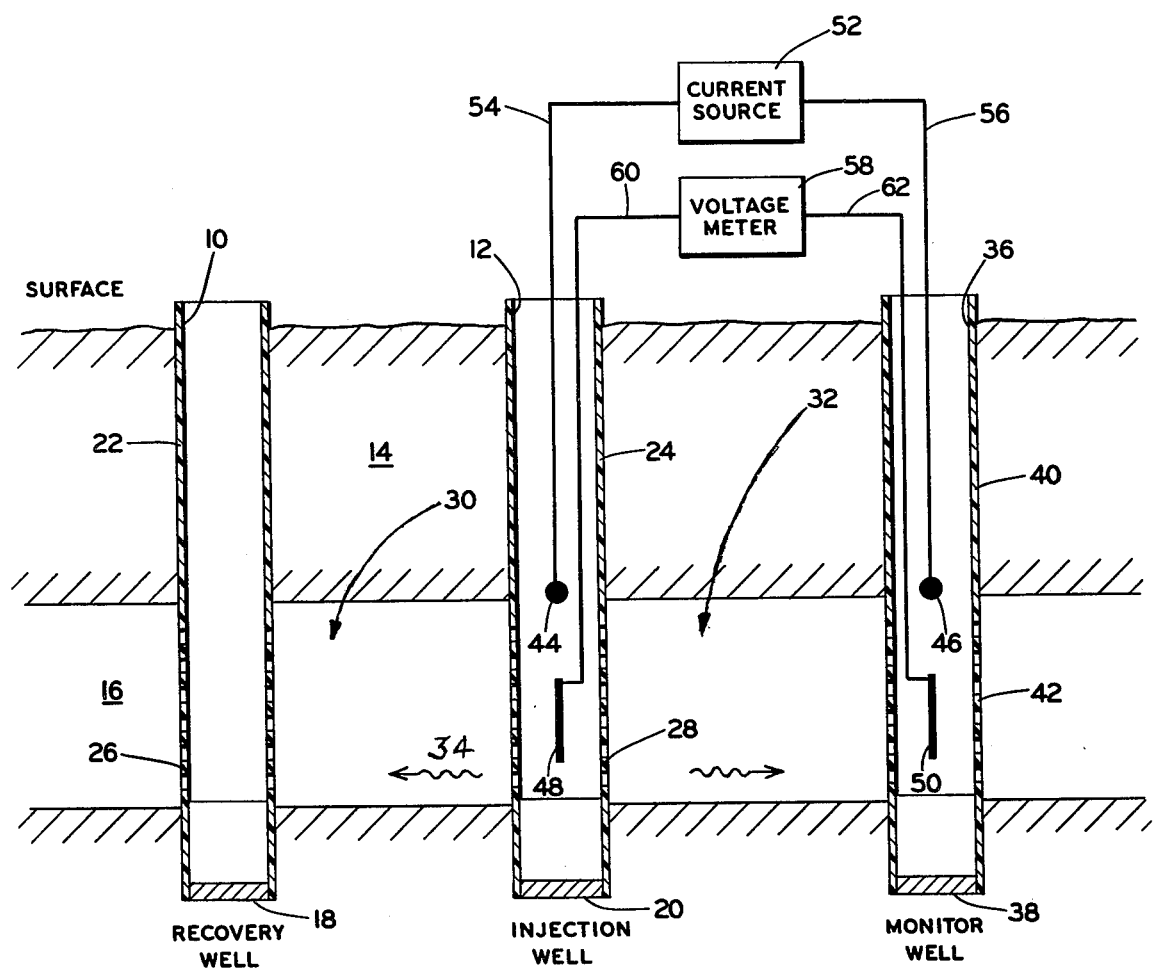
FIG. 1 is a cross sectional view of a subsurface mineral bearing formation penetrated by an injection well, a recovery well and a monitor well equipped with current probes and voltage probes for practicing the invention.

Referring to FIG. 1, a pair of conventional boreholes 10 and 12 are shown drilled into the earth for penetrating overlying strata 14 and a uranium ore or other mineral deposit 16. The lower ends of boreholes 10 and 12 are sealed by conventional caps 18 and 20. The boreholes 10 and 12 are jacketed by electrically insulating, corrosion resistant casings 22 and 24 formed preferably of plastic or fiberglass. A portion of each of the casings 22 and 24 is formed as a screen 26, 28 having slots or perforations that enable leach solution to flow outwardly from borehole 12 and dissolved minerals to flow into the borehole 10 in the usual manner. The borehole 12 is usually referred to as "injection well" while the borehole 10 is referred to as "recovery well" in conventional mineral leaching.

A suitable leach solution (lixiviant), such as ammonium carbonate or sulfuric acid, is distributed into injection well 12 by suitable piping (not shown) and allowed to disperse into the ore formation 16 through screen 28. The screen 28 is positioned at a depth corresponding to the depth of the ore formation, with enough leach solution being supplied to cover a depth that is slightly greater than the depth of the formation 16 to dissolve a maximum amount of mineral. The leach solution chemically reacts with the ore 16 (e.g., $UO_3$ $UO_2$ of uranium ore) as the solution penetrates the ore toward the recovery well 10. After some period of time, the zone between injection well 20 and recovery well 24 has been bridged by leach solution and the solution and dissolved ore are withdrawn from recovery well 10 by conventional techniques, such as by pumping through tubing (not shown). The leach solution is pumped to treatment or processing equipment (not shown) where desired minerals are separated for commercial use using conventional chemical separation or refining processes. The recovery process is continued until the desired mineral is leached out to the extent that it is no longer practical to continue the process.

Figure 3:
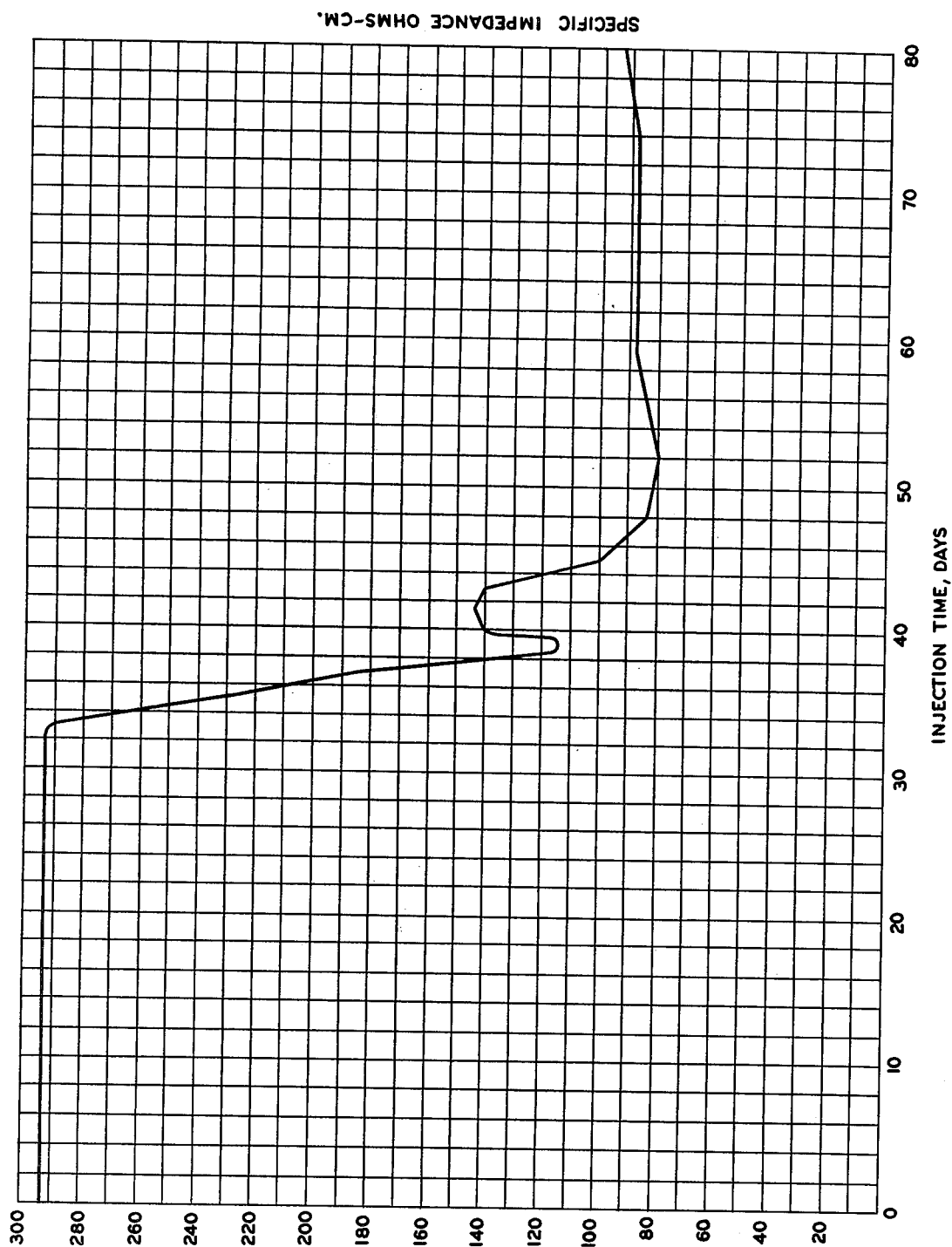
FIG. 3 is a graph showing impedance verses time of an ore formation into which leach solution has been injected.
Figure 4:
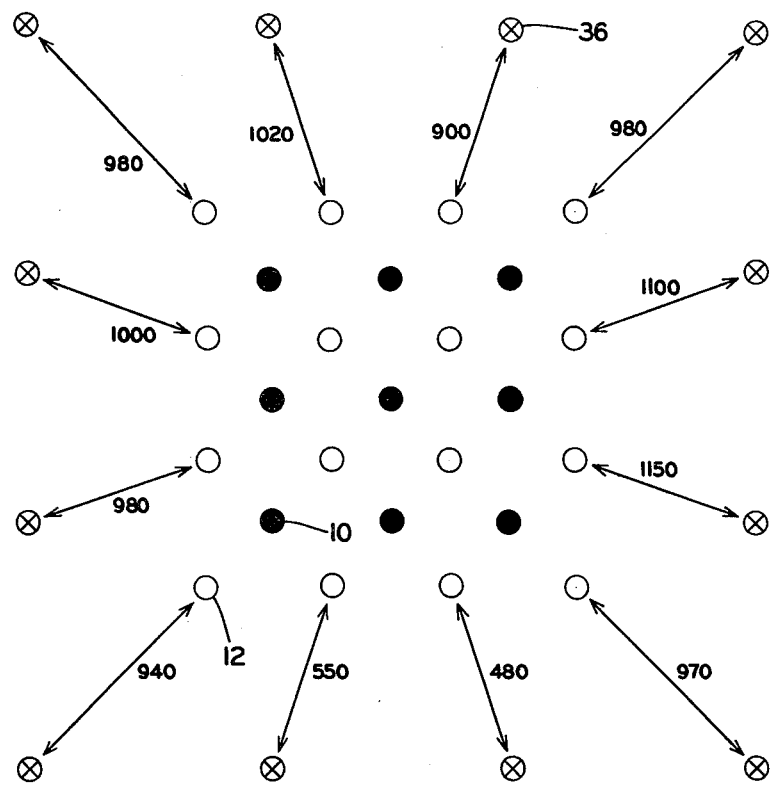
FIG. 4 is a diagram showing an array of injection wells, production wells and monitor wells together with impedance measurement paths at a leaching site in accordance with one embodiment of the invention.

During the leaching process, there is a tendency for leach solution from injection well 12 to escape from the desired leaching zone 30 between injection well 12 and recovery well 10 into an undesired zone 32. To detect the presence of escaping leach solution 34, an additional borehole 36 is drilled into the earth outside the desired leaching zone 30. The borehole 36, identified hereinafter as "monitor well" is equipped with an end plug 38 and casing 40 having a screen 42, in the same manner as described with respect to injection well 12 and recovery well 10. It is to be understood that although only single injection, recovery and monitor wells are shown in FIG. 1, a number of each type of well arranged in a predetermined pattern or array depending upon particular requirements would be provided in practice as shown in FIGS. 3 and 4, for example.

In accordance with the invention, the electrical impedance of zone 32 is monitored by positioning a pair of current supply probes 44 and 46 together with voltage measuring probes 48 and 50 within, respectively, the injection well 12 and monitor well 36. The current supply probes 44 and 46 are located within the two wells at or just above the upper ends of screens 28 and 42. Voltage measuring probes 48 and 50 are positioned beneath the current supply probes 44 and 46 in exposure to each other through the screens 28 and 42. The current supply probes 44 and 46 are preferably located within the range of 5 to 20 feet above the upper ends of the screens 28 and 42, although the exact position within that range is not critical. The voltage probes 48 and 50 preferably extend along the entire length of screens 28 and 42, that is, from just above the upper ends of the screens to just below the lower ends thereof. Shorter probes may be used, however, as shown in FIG. 1, with proportionally reduced sensitivity. The significance of the probe placement described herein is that current is forced to flow along a path through ore formation 16 at a depth defined by the depth of the casing screens 26, 28 because the impedance of the casing 22, 24 at each well to current flow is lowest at said screen.

A constant current source 52 is connected to the current supply probes 44, 46 through conductors 54 and 56. A voltage meter 58 is similarly connected to the voltage measuring probes 48 and 50 through conductors 60 and 62, as shown in FIG. 1. The current source 52 is preferably a constant current, square wave current generator having a frequency of between 1 hertz and 20 hertz. The magnitude of current generated by current source 52 is preferably as high as possible in order to maximize signal-to-noise ratio. In order to reduce power supply requirements, and to avoid disassociation of the leach solution, I have found that a current magnitude of about up to 10 amperes peak is preferred.

Figure 2:
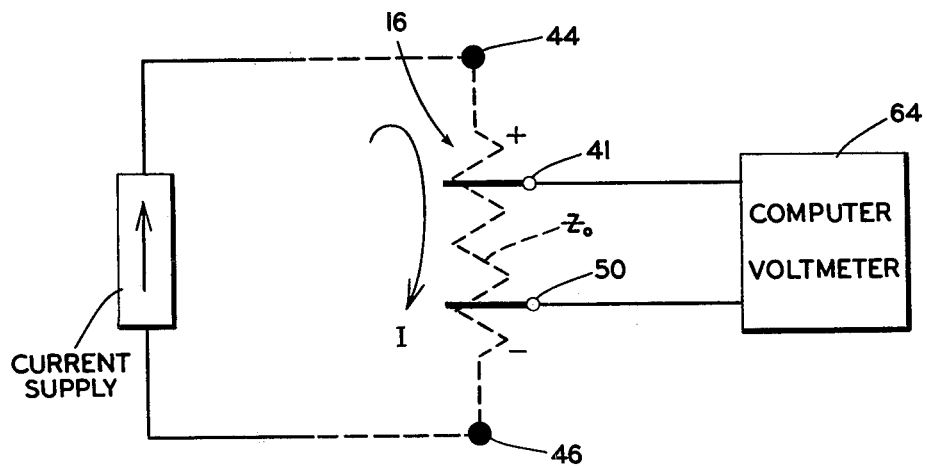
FIG. 2 is a diagram of an equivalent electrical circuit showing the constant current source and voltage drop induced across the ore formation together with a computer for interpreting the results.

Referring to FIG. 2, the impedance of the ore formation 16 between voltage measuring probes 48 and 50 is symbolized by $Z_0$. The magnitude of this impedance is a function of the amount of leach solution within zone 32, that is, the impedance decreases as the quantity of leach solution within the zone increases. The lower impedance is caused as a result of the ionic concentration of the leach solution which is greater than the ionic concentration of water naturally occurring within the zone 32. Since the nominal impedance of the zone 32 can be determined by measuring the impedance prior to delivery of leach solution into the injection well 12, any significant subsequent decrease in impedance can be attributed to the presence of leach solution that has escaped into the zone 32.

Still referring to FIG. 2, since the amount of current flowing through zone impedance $Z_0$ is constant, it is evident that the voltage drop across probes 48 and 50 is a function of only the magnitude of impedance $Z_0$. This voltage is monitored by meter 58 and compared with the predetermined, nominal impedance of the ore formation within zone 32 to determine the presence or absence of escaping leach solution.

FIG. 3 illustrates the measured specific impedance in an acquifer as sulfuric acid leach solution replaced groundwater. The strength of the injected leach solution was increased very slowly for about 30 days, and then was increased more rapidly. FIG. 3 shows that the specific impedance decreased to less than one-third of the initial value. The decrease in specific impedance (ohm-cm) decreased the total impedance (ohm), thereby making the invention feasible.

Monitoring of the voltage drop across probes 48 and 50 can be made continuously or periodically, either manually, or by a programmed, general purpose digital computer 64, as shown in FIG. 2. Of particular significance, the output of voltage probes 48 and 50 is responsive to the presence of any leach solution that escapes into the zone 32 before the solution has migrated toward the monitor well 36. This is in contrast to prior leach solution detection systems of which I am aware that are responsive to the presence of leach solution only after the solution has penetrated the monitor well screen. Accordingly, the presence of escaping leach solution can be detected early, thereby enabling corrective measures to be undertaken.

Referring to FIG. 4, an example of a typical well array at a leaching site is shown. A number of injection wells 12 are distributed within the site and interposed with another number of recovery wells. The number of injection wells 12 in practice may be greater, smaller or equal to the number of recovery wells 10. The leach solution injected into the leaching site through the injection wells 12 is distributed throughout the site, but should not be permitted to extend substantially out of the site. An array of monitor wells 36 are thus distributed around the outer most group of injection wells 36, as shown, to monitor the impedance of the zone between the monitor wells and injection wells shown in FIG. 4. The arrows extending between monitor wells 36 and the closest, corresponding injection wells 12 indicate the paths along which geophysical impedances are monitored by the current and voltage probe pairs described in connection with FIG. 1. Thus, a pair of current and voltage probes are needed for each monitor well 36 and corresponding injection well 12. The voltage outputs of the voltage measuring probes within the corresponding pairs of monitor and injection wells may be supplied to a computer 64 (FIG. 2) to develop a map of the impedances distributed within the monitored zone shown in FIG. 4. It is thereby possible to determine the amount of any leach solution that has escaped into the monitored zone by inspection of the map.

An example of the above mentioned process is shown in FIG. 4, wherein the numbers distributed in the monitored zone defined by the arrows indicate relative voltages that could be measured by voltage probes 48 and 50 at a particular point in time. It can be noted that the voltages measured in the monitored zone at a position of about six o'clock are significantly lower than the remaining measured voltages. It can therefore be presumed that there is an abnormally high ion concentration within the six o'clock region of the monitored zone which is an indication that leach solution has escaped into this region.

Figure 5:
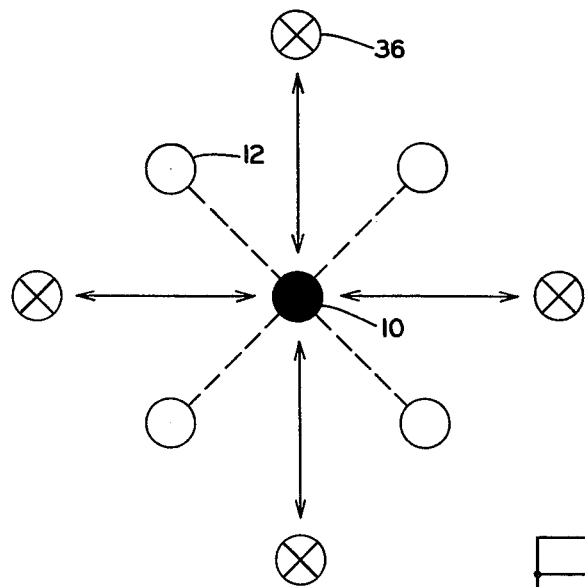
FIG. 5 is a diagram of an alternative array of wells and impedance paths.
Figure 6:
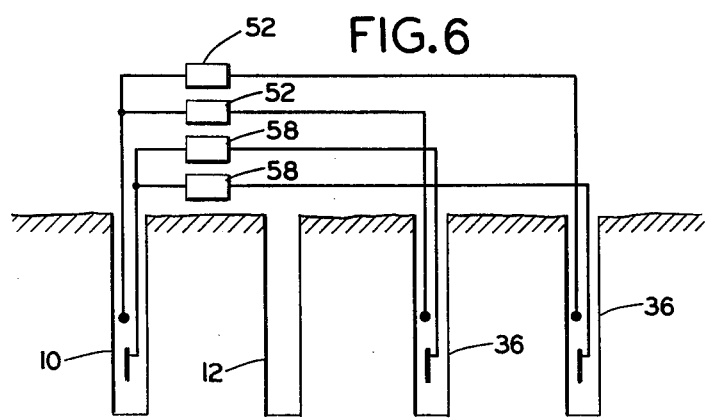
FIG. 6 is a cross sectional side view of the array of FIG. 5 showing probe placement.

Referring to FIG. 5, an alternative array of monitor, injection and recovery wells designed to reduce the total number of probes required for detecting escaping leach solution is shown wherein a single, center recovery well 10 is positioned in communication with four injection wells 12 (the number of injection wells is arbitrary). This type of array is probably not suitable for large mining installations, but is adequate for smaller applications. A number of monitor wells 36 are positioned outside the region surrounded by the injection and recovery wells 12, 10. During a leaching operation, leach solution tends to flow substantially along the paths shown in the dotted lines. Any leach solution flowing along the paths defined by the arrows, however, would have a tendency to escape outside the leaching site and be detected by the monitor wells 36. In accordance with the embodiment of the invention shown in FIG. 5, a single current supply probe and a single voltage measuring probe are positioned in the recovery well 10. An additional current supply probe and voltage measuring probe are also located in each of the monitor wells 36. The current and voltage probes in each of the monitor wells 36 cooperate with the single current probe and voltage probe in the center recovery well 10, that is, each of the constant current sources has one terminal connected to the probe in recovery well 18 and its remaining terminal connected to the current probe in a different one of the monitor wells 36. Similarly, each voltage meter has one terminal connected to the voltage probe in center recovery well 10 and its remaining terminal connected to the voltage measuring probe in a different monitor well. This arrangement is illustrated schematically in FIG. 6 wherein is shown two monitor wells 36 distributed around center recovery well 10. The total number of current and voltage probes saved in the configuration of FIG. 6 compared to the configuration of FIG. 4 is (M−1), where M is the number of monitor wells in the array.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

I claim:

1. A method of detecting presence or absence of leach solution escaping from a desired underground leaching zone having an injection well and a recovery well extending thereto from ground above, wherein leach solution is delivered through the injection well to a region of said zone having an ore formation between the two wells, and dissolved minerals are recovered from said recovery well, comprising the steps of establishing a monitor well outside said region between said injection and recovery wells; measuring an impedance of underground formation between said monitor well and one of said injection well and said recovery well at a depth below said ground substantially corresponding to that of said zone; and correlating said measured impedance to a presence or absence of leach solution.

2. The method of claim 1, wherein said measuring step includes the steps of locating a first current probe and a first voltage probe in said monitor well; locating a second current probe and a second voltage probe in one of said injection well and recovery well; generating a constant current between said current probes; and monitoring a voltage drop between said voltage probes.

3. The method of claim 2, wherein said locating steps includes positioning said voltage probes below said current probes within said wells.

4. The method of claim 3, wherein said injection, recovery and monitor wells are jacketed in electrically insulating casings, the casings of said probe-containing wells having a portion formed with apertures, and said locating steps further include the steps of positioning said current probes above said apertures, and positioning said voltage probes for exposure through said apertures, a current flow path thereby being established through said voltage probes at the apertured portions of said well casings.

5. The method of claim 1, wherein said locating steps including positioning said current and voltage probes in said injection well and said monitor well.

6. The method of claim 1, wherein said locating steps include positioning said current and voltage probes in said recovery well and said monitor well.

7. The method of claim 2, wherein said constant current has a frequency in the range of 1–20 Hz.

8. An apparatus for detecting leakage of leach solution outside a desired leaching zone, comprising:
 an injection well into which leaching solution is delivered for dissolving a mineral from an ore formation;
 a recovery well for withdrawing dissolved minerals, said injection and recovery wells being located within the desired leaching zone being mined, and a monitor well located outside said desired leaching zone, wherein each of said wells includes an electrically insulating casing, and a portion having formed therein apertures facilitating flow of said solution and dissolved minerals through said zone;
 a set of impedance monitoring probes located within said monitor well and one of said injection well and recovery well wherein each set of probes, including a current supplying probe and a voltage measuring probe, is located at a depth in said wells substantially corresponding to the position of said apertures;
 means for operating said probes to measure electrical impedance of an earth formation between said probes, and
 means responsive to signals generated by said probes for correlating an impedance measurement to presence or absence of leach solution between said monitor well and said one of said injection well and recovery well.

9. The apparatus of claim 8, wherein said voltage probes are positioned beneath said current probes.

10. The apparatus of claim 9, including a source for supplying a constant current to said current probes.

11. The apparatus of claim 8, wherein said impedance monitoring probes are located in said monitor well and said injection well.

12. The apparatus of claim 8, wherein said impedance monitoring probes are located in said monitor well and said recovery well.

* * * * *